US005445365A

United States Patent [19]

Förderer

[11] Patent Number: 5,445,365
[45] Date of Patent: Aug. 29, 1995

[54] ANTI-VIBRATION ELEMENT

[75] Inventor: Karl Förderer, Schwaikheim, Germany

[73] Assignee: Firma Andreas Stihl, Waiblingen, Germany

[21] Appl. No.: 210,888

[22] Filed: Mar. 18, 1994

[30] Foreign Application Priority Data

Mar. 18, 1993 [DE] Germany ............... 43 08 641.1

[51] Int. Cl.⁶ ................................. F16F 1/36
[52] U.S. Cl. .................................... 267/137; 30/383; 173/162.2; 267/153
[58] Field of Search ............... 267/153, 141, 141.1, 267/137, 293, 294, 292, 269, 270; 173/162.2; 30/383, 381; 16/116 R; 403/7, 344, 373; 411/904, 907; 188/378–380

[56] References Cited

U.S. PATENT DOCUMENTS

| | | | |
|---|---|---|---|
| 1,834,502 | 12/1931 | Smith | 267/269 X |
| 2,771,312 | 11/1956 | Thiry | 267/269 X |
| 3,057,609 | 10/1962 | Krekeler | 267/137 X |
| 3,302,673 | 2/1967 | Forsberg | 16/116 R X |
| 3,845,827 | 11/1974 | Schulin | 267/137 X |
| 4,135,301 | 1/1979 | Hoeppner | 267/137 X |
| 5,046,566 | 9/1991 | Dorner et al. | |

Primary Examiner—Douglas C. Butler
Attorney, Agent, or Firm—Robert W. Becker & Associates

[57] ABSTRACT

An anti-vibration element has a tubular elastic base body with a first and a second end for connecting parts in a vibration-damping manner. A dumbbell-shaped bolt has a connecting element and a first and a second clamping element connected to opposite ends of the connecting element. The dumbbell-shaped bolt is inserted into the base body such that the dumbbell-shaped bolt has limited axial displacement. The connecting element can be made of a substantially rigid or a substantially elastic material. In a preferred embodiment, the first clamping element is axially fixed relative to the longitudinal axis of the base body and the second clamping element is axially displaceable relative to the longitudinal axis of the base body.

7 Claims, 5 Drawing Sheets

5,445,365

ANTI-VIBRATION ELEMENT

BACKGROUND OF THE INVENTION

The present invention relates to an anti-vibration element having a tubular, elastic base body at the ends of which parts to be connected are attached.

From German Offenlegungsschrift 40 02 459 a motor-operated, hand-held working tool with a grip arrangement that is connected to the device by anti-vibration elements is known. The anti-vibration elements are comprised of a tubular elastic base body. The material of the base body is rubber. At the two ends of the base body the parts to be connected, motor and grip arrangement, are attached. For this purpose, at both ends circumferential grooves are provided in which the parts to be connected, respectively, an intermediate connecting piece, are fixed such that the radial expansion of the base body at the circumferential grooves is prevented. For fastening the base body, stoppers or lids are inserted into the base body. The stoppers or lids have an outer diameter that is greater than the inner diameter of the base body so that the material of the elastic base body in the area of the circumferential grooves is subjected to a radially outwardly oriented force that presses the circumferential grooves into a corresponding counter member of the parts, respectively, the intermediate piece to be connected.

The damping function of the individual anti-vibration elements depends substantially on the elasticity, respectively, the damping properties of the material used for the base body. With a suitable arrangement of the anti-vibration elements at the motor the vibration-damping properties of the grip arrangement can be greatly improved.

It is a disadvantage of the known anti-vibration elements that at least three components must be used, i.e., a base body and two stoppers or lids. Furthermore, the base body must be accessible from both ends for mounting and assembly.

It is therefore an object of the present invention to provide an anti-vibration element of the aforementioned kind with which the number of components is reduced and the assembly is facilitated.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
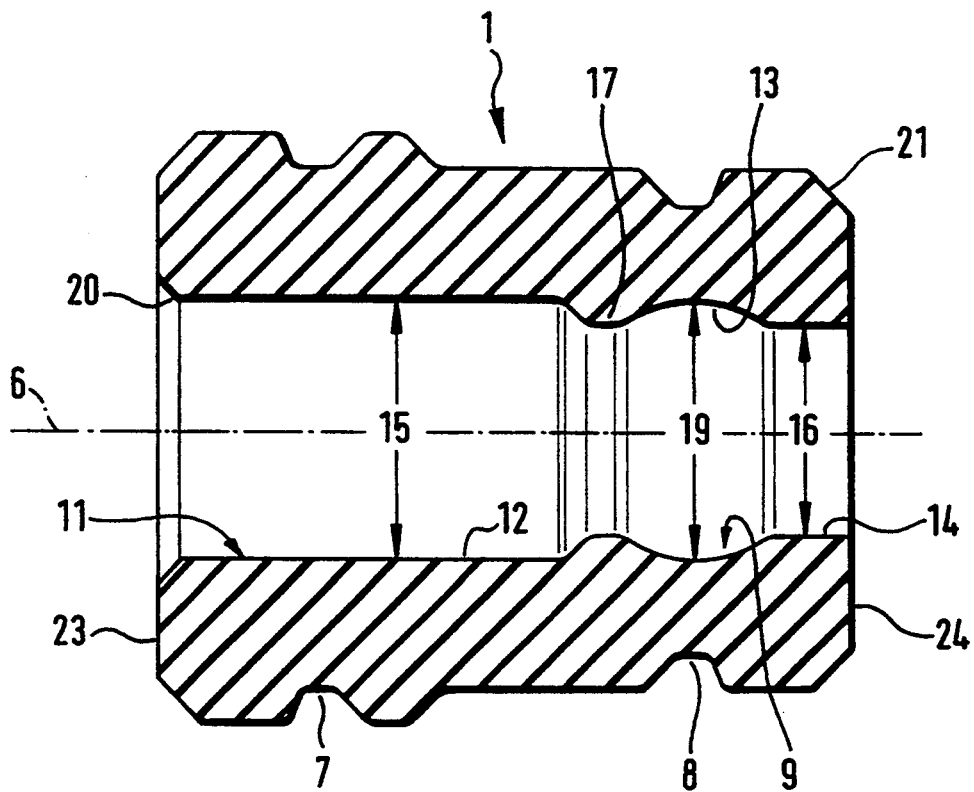
FIG. 1 shows a base body of an anti-vibration element in a first embodiment.

The anti-vibration element according to the present invention is primarily characterized by:

A tubular elastic base body with a first and a second end for connecting parts in a vibration-damping manner; and A dumbbell-shaped bolt comprised of a connecting element and a first and a second clamping element connected to opposite ends of the connecting element;

The dumbbell-shaped bolt inserted into the base body such that the dumbbell-shaped bolt has limited axial displacement.

Preferably, the connecting element is comprised of a substantially rigid material. In the alternative, the connecting element is comprised of an elastic material.

Expediently, the first clamping element is substantially axially fixed relative to a longitudinal axis of the base body and the second clamping element is axially displaceable relative to the longitudinal axis of the base body. Preferably, the first and the second ends of the base body each have a circumferential groove for receiving the parts to be connected therein so as to circumferentially compress the circumferential grooves. In an area of one of the circumferential grooves an inner wall of the base body has a bearing for receiving the first clamping element, the bearing being shaped to complement a shape of the first clamping element.

Advantageously, the first and the second clamping elements rest at the inner wall of the base body in an area of the circumferential grooves.

Advantageously, the first clamping element has a shape selected from the group consisting of a sphere, a barrel, and a cylinder. In a preferred embodiment of the present invention, the first and the second clamping elements have the same shape.

In another embodiment of the present invention, the diameter of the clamping elements is greater than an inner diameter of the base body.

Advantageously, at least one of the first and second clamping elements has a circumferential groove for engagement by a tool.

According to the present invention, the base body receives a dumbbell-shaped bolt that has two clamping elements connected to a connecting element whereby the clamping elements are limited in their axial displacement.

This inventive anti-vibration element has the advantage that only two components are employed so that the manufacturing cost are reduced. Furthermore, the assembly of the anti-vibration element is accomplished simply by inserting the bolt into the base body. This insertion can be performed from both ends of the base body and has the advantage that the assembly is possible also at locations that are difficult to access. The damping properties of the anti-vibration element depend on the resistance with which the clamping elements are axially displaceable.

Inventively, the connecting element is comprised of a rigid or substantially rigid material or, in the alternative, an elastic material. When an elastic material is used, vibrations of one clamping element are transmitted to the other clamping element in a dampened manner.

In an advantageous embodiment the base body is provided at both ends with circumferential grooves in which the parts, respectively, the intermediate piece to be connected are fixed so as to compress circumferentially the base body at the circumferential grooves.

Inventively, in the area of one circumferential groove at the inner wall of the base body a bearing is provided for receiving the first clamping element which is provided with a bearing surface that complements the shape of the first clamping element. Accordingly, the first clamping element is advantageously substantially axially fixed, respectively, approximately axially fixed in its position.

Expediently, the fist clamping element has a spherical, cylindrical, or barrel shape. When the clamping element is spherical, the area of contact with the base body is smaller than for a barrel-shaped clamping element. However, a spherical clamping element can rotate more easily. Furthermore, an axial displacement in the direction of the longitudinal axis of the base body is possible with less resistance.

Preferably, the first and the second clamping elements have the same shape, i.e., are especially spherical, cylindrical, or barrel shaped, whereby the corresponding bearing of the first clamping element has a bearing surface that is adapted or complementary to the shape of the first clamping element.

In order for the bolt to be able to pressurize the base body in the area of the circumferential groove, the diameter of the clamping element is somewhat greater than the corresponding inner diameter of the base body.

The material of the clamping elements is substantially non-elastic material, especially metal or plastic.

For facilitating the assembly, at least one of the clamping elements may be provided with a circumferential groove perpendicular to the longitudinal axis which serves as an engagement groove for a tool.

DESCRIPTION OF PREFERRED EMBODIMENTS

The present invention will now be described in detail with the aid of several specific embodiments utilizing FIGS. 1 through 9.

FIG. 1 represents in longitudinal section a base body 1 made of an elastic material (rubber) which is essentially tubular or annular, and, with respect to its function, is also called annular buffer. This base body 1 is mounted between a motor of a hand-held working tool and its grip arrangement in order to dampen the transmission of vibrations resulting from the operation of the motor onto the grip arrangement and to thereby ensure a safe guidance of the tool.

The base body 1 is tubular. The inner wall 11 of the base body 1 is comprised of a first tubular section 12 that has a transition in the form of a dam-shaped circular annular shoulder 17 into a spherical recess 13. A second tubular section 14 is positioned adjacent to the spherical recess 13. The tubular section 14 has a reduced inner diameter 16 as compared to the first tubular section 12. Furthermore, the second tubular section 14 in the longitudinal direction is substantially shorter than the first tubular section 12. The maximum inner diameter 19 delimited by the spherical recess 13 corresponds substantially to the inner diameter 15 of the first tubular section 12. The aforementioned annular shoulder 17 and the spherical recess 13 together form a bearing 9 for a clamping element which will be described in the following.

The outer wall of the base body 1 is cylindrical. It is provided with two circumferential annular outer grooves 7, 8 which are perpendicular to the longitudinal axis 6 of the base body 1. Both outer grooves 7, 8 are placed at a certain identical distance from the end faces 23, 24 of the base body 1 whereby the outer groove 8 is located centrally about the aforementioned recess 13 of the inner wall 11 and the outer groove 7 is located about the first tubular section 12 of the inner wall 11. In the area of the outer groove 7 the base body 11 is provided with a circumferential projection that corresponds approximately to the depth of the outer groove 7.

Figure 2:
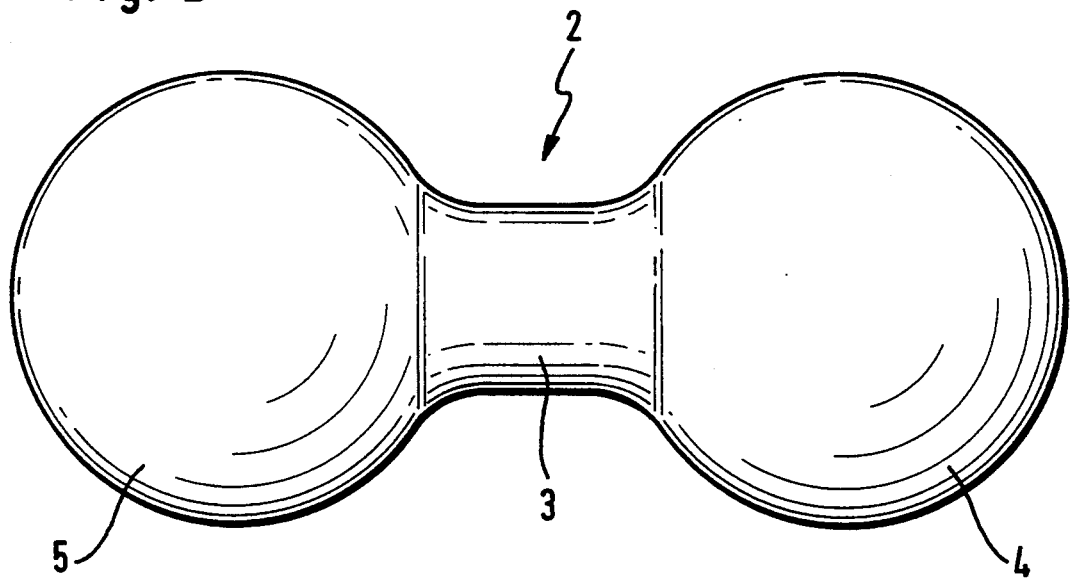
FIG. 2 shows a bolt with spherical clamping elements.

In FIG. 2 a dumbbell-shaped bolt 2 is shown which is comprised of connecting element in the form of a rod 3 with two spherical clamping elements 4, 5 substantially of the same size connected at both ends of the rod 3. This bolt 2 is inserted into the interior of the base body 11 embodied according to FIG. 1. See FIG. 3 for the assembled anti-vibration element.

As shown in FIG. 2, the diameter of the two clamping elements 4, 5 is greater than the aforementioned tubular sections 12, 14 of the inner wall 11 defined by the inner diameter 15, 16 and the maximum inner diameter 19 of the spherical recess 13 (see also FIG. 1). The base body 1 is thus radially expanded by the spherical clamping elements 4, 5. The clamping elements 4, 5 are in turn also clamped. The radial expansion of the base body 1 in the area of the outer grooves 7, 8 is prevented by the parts connected thereto (housing, respectively, motor and grip arrangement). One of the two clamping elements 4 is arranged within the bearing 9 described above in connection with FIG. 1 and is fixed in its position due to the embodiment of the annular shoulder 17. The second clamping element 5 is arranged in the area of the first tubular section 12 of the inner wall 11 whereby the center of this clamping element is positioned at the outer groove 7. The base body 1 which is made of an elastic material, for example, rubber, is displaceable at the location of the second clamping element 5 against a frictional resistance while the base body I is quasi axially fixed at the location of the first clamping element 4. The bolt 2 must be inserted for assembly into the interior of the base body 1 in the longitudinal direction by exerting a force. For facilitating mounting, an inner edge 20 at the transition of the end face 23 into the first tubular section 12 of the inner wall is slightly slanted. The outer edge 21 at the transition of the respective end face 23, 24 to the outer wall of the base body 1 is also slanted.

Figure 4:
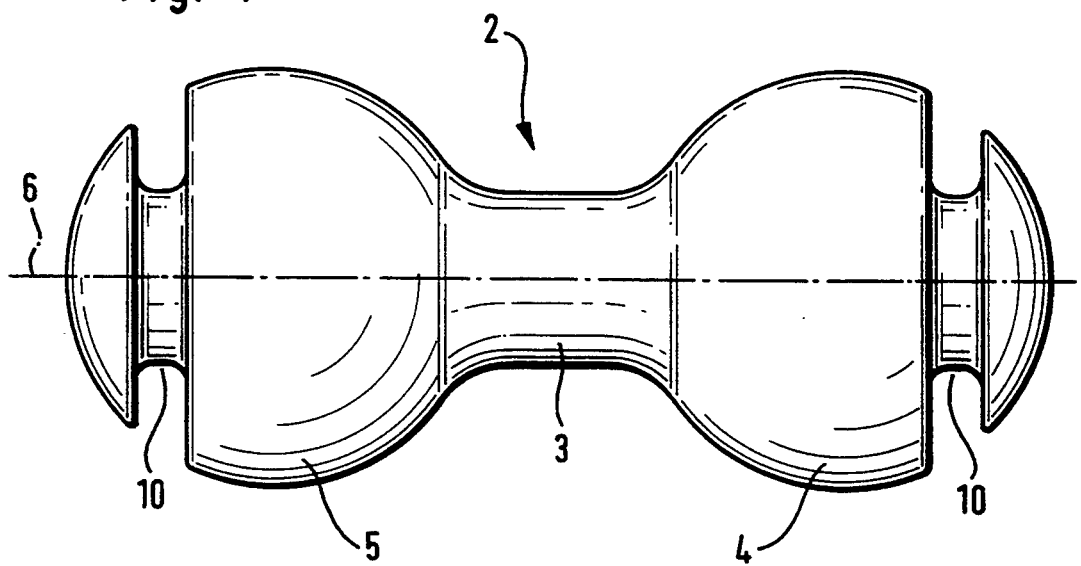
FIG. 4 shows a bolt with spherical clamping elements and circumferential grooves for engagement by tools.

FIG. 4 shows a bolt 2 as described in connection with FIG. 2. However, each of the clamping elements 4, 5 is provided with a circumferential groove 10 that is perpendicular to the longitudinal axis 6. The circumferential groove 10 is provided at the end of the clamping elements 4, 5 facing away from the rod 3 and serves as an engagement point for a tool so that mounting an demounting can be facilitated.

Figure 5:
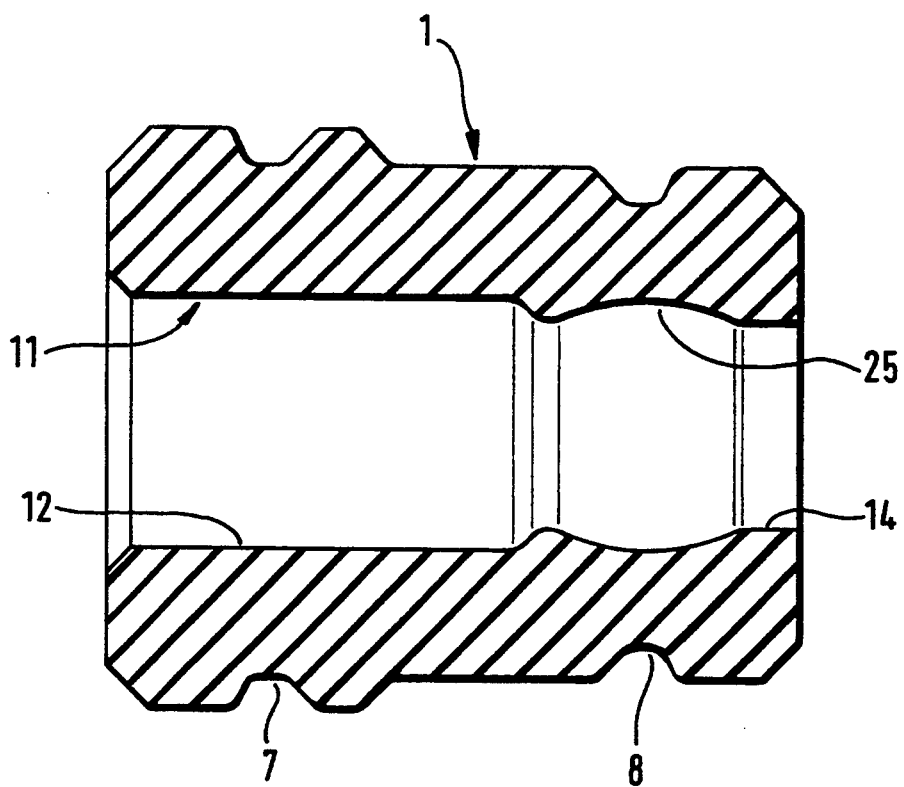
FIG. 5 shows a base body in a second embodiment.

FIG. 5 shows a base body 1, as already shown in FIG. 1. However, in this embodiment the spherical recess 13 (FIG. 1) is replaced by a barrel-shaped recess 25.

Figure 6:
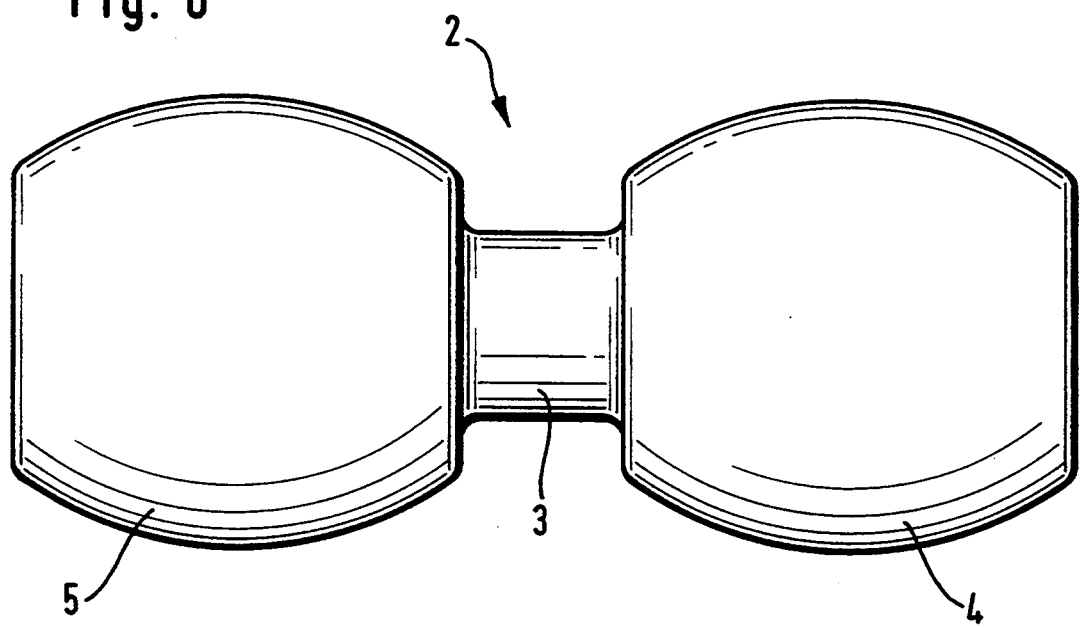
FIG. 6 shows a bolt with barrel-shaped clamping elements.

FIG. 6 shows a bolt 2, similar to the embodiment of FIG. 2. However, the clamping elements 4, 5 are no longer spherical, but barrel shaped corresponding to the recess 25 of the inner wall 11 of the base body according to FIG. 5.

Figure 3:
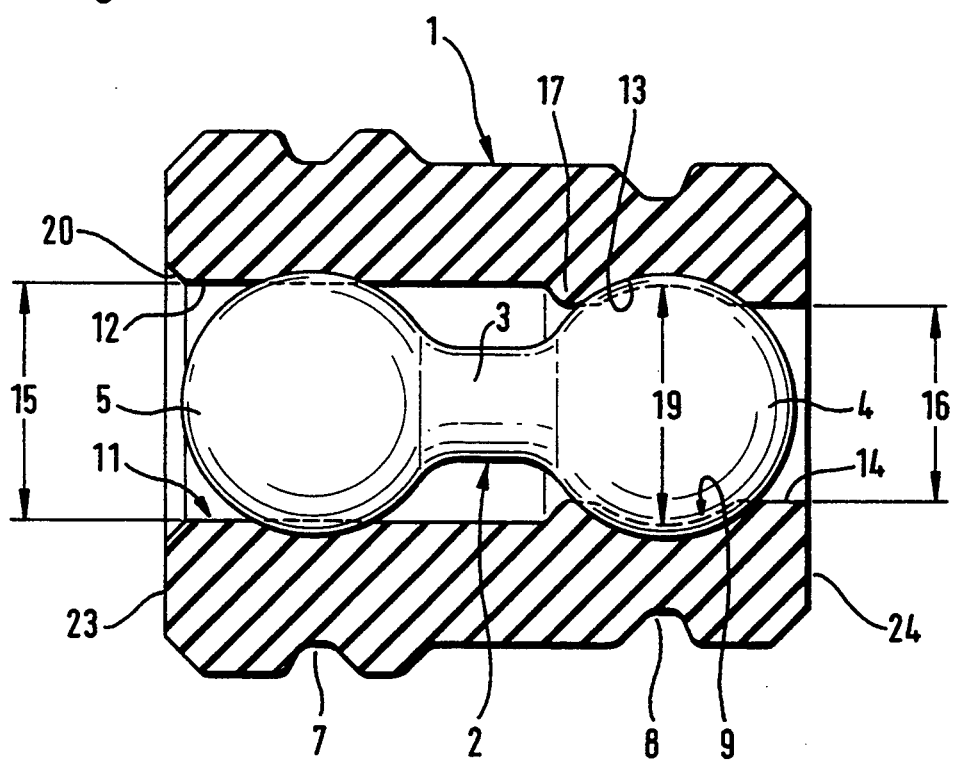
FIG. 3 shows the bolt of FIG. 2 mounted within the base body of FIG. 1.
Figure 7:
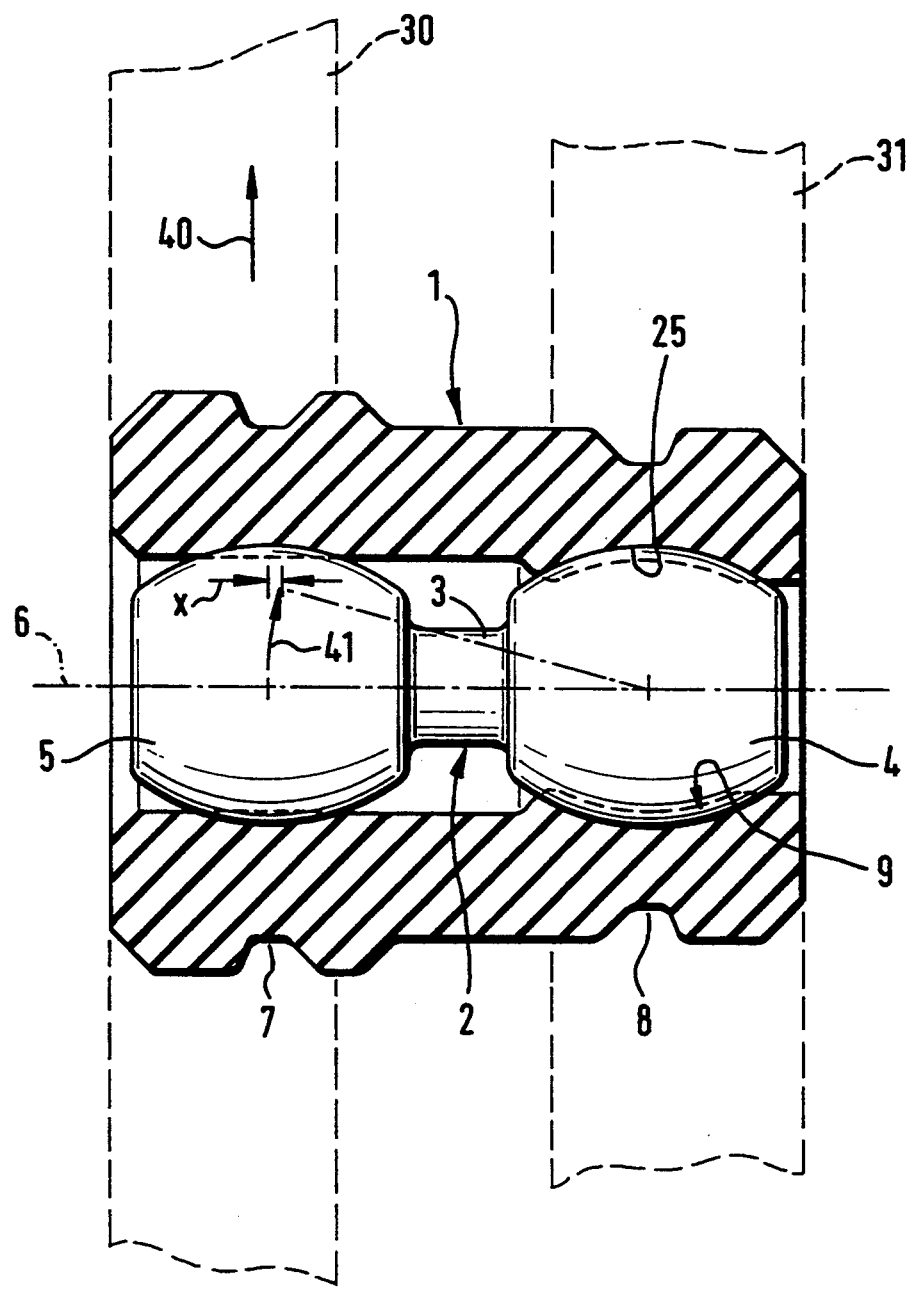
FIG. 7 shows the assembled anti-vibration element according to FIGS. 5 and 6.

When the bolt 2 with the barrel-shaped clamping elements 4, 5 is inserted into the interior of the base body 1, as represented in FIG. 7, a greater frictional surface is provided due to the barrel-shaped embodiment as compared to the spherical embodiment so that the clamping element 4 is axially fixed to a greater extent than in the embodiment of FIG. 3. The Figures are not to scale, i.e., the bolts 2 in FIGS. 2, 4, 6 are enlarged relative to the corresponding base bodies 1 shown in FIGS. 1 and 5.

When the housing part 30 (FIG. 7) is moved relative to the housing part 31 in the direction of arrow 50, the clamping element 5 is displaced in the direction of arrow 41. Accordingly, the clamping element 4 is rotated in the bearing 9 of the base body 1 whereby it is axially fixed relative to the base body 1. The clamping element 5 due to the rotational movement is displaced by the axial displacement x within the base body 1. The vibration-damping properties of the inventive arrangement are maintained despite the one-part bolt 2 positioned within both housing parts 30, 31. In practice, improved damping$_G$ properties relative to known embodiments have been observed.

Figure 8:
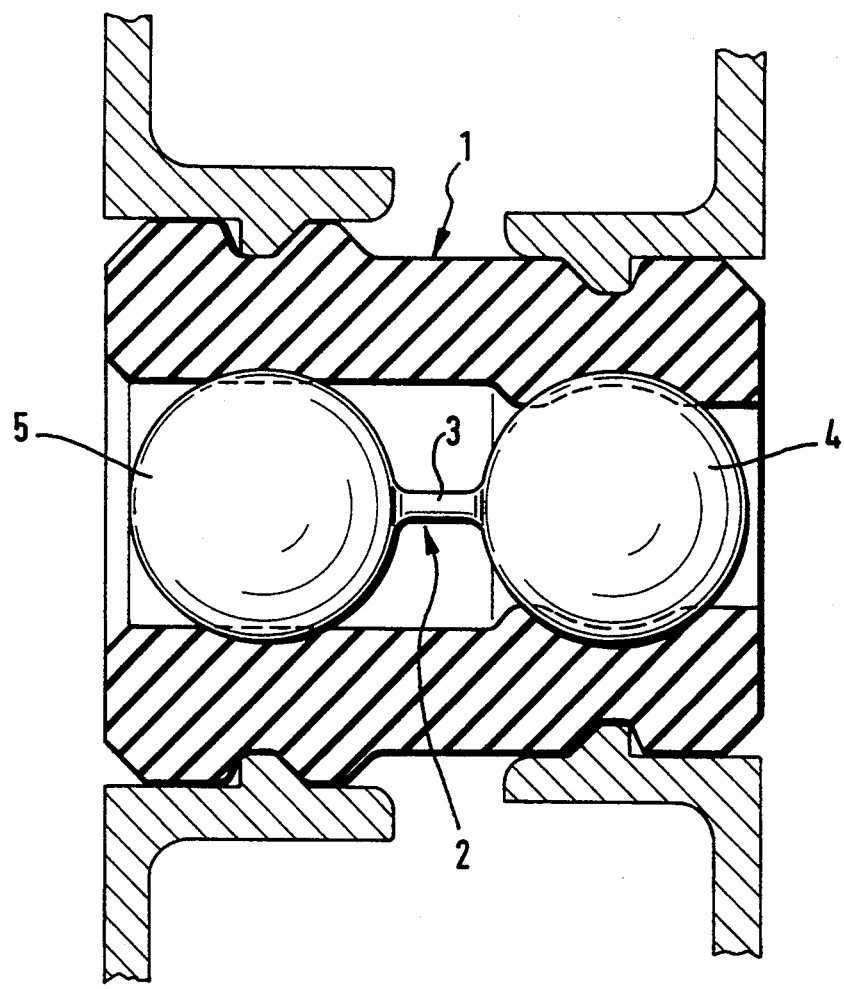
FIG. 8 shows the assembled anti-vibration element with an elastic connecting element.

FIG. 8 represents a bolt 2, as shown in FIG. 2. However, the rod 3 between the two clamping elements 4, 5 in this embodiment are made of an elastic material so that an elastic coupling results which provides for an additional damping of the forces acting on the clamping elements 4, 5 before transmittal onto the respective other clamping body 4, 5.

Figure 9:
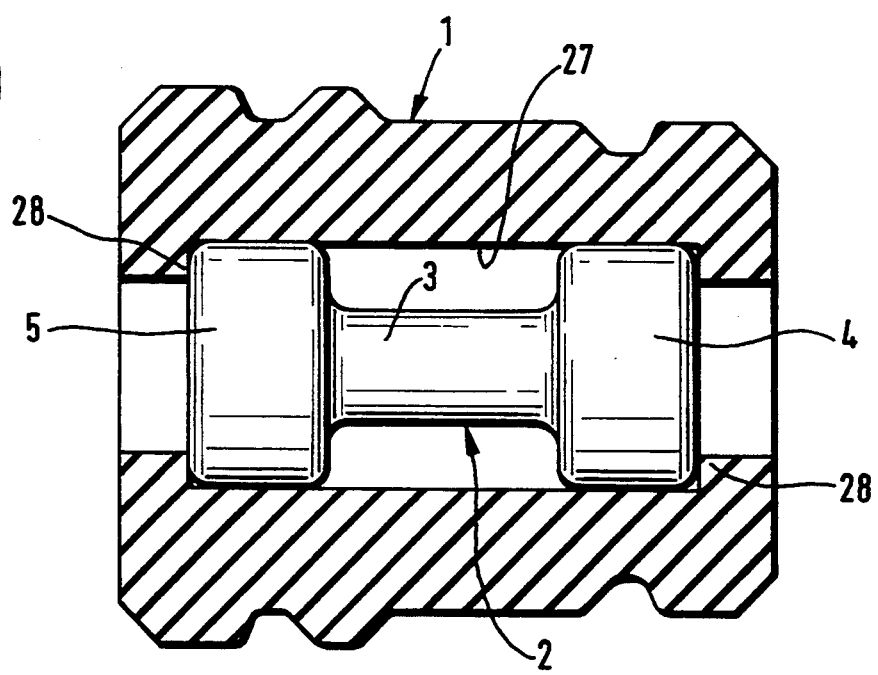
FIG. 9 shows an alternative embodiment with a rigid connecting element.

FIG. 9 shows another embodiment in which a bolt 2 with two clamping elements 4, 5 is arranged within the base body 1. The connecting element, i.e., the rod 3, in this embodiment is rigid. In contrast to the aforedescribed embodiments of FIGS. 3 and 7, the two clamping elements 4, 5 are not spherical or barrel shaped in cross-section, but cylindrical. None of the clamping elements 4, 5 in this embodiment is supported in a bearing. The base body 1 has a cylindrical recess 27 that on both end faces is delimited by circumferential inner projections 28. The clamping elements 4, 5 respectively rest at these circumferential projections 28 so that their axial displacement is limited. The circumferential projections 28 have a radial diameter such that the bolt 2 is inserted into the base body 1 by widening the circumferential projections 28.

The present invention is, of course, in no way restricted to the specific disclosure of the specification and drawings, but also encompasses any modifications within the scope of the appended claims.

What is claimed is:

1. An anti-vibration element for connecting two parts in a vibration damping manner, said anti-vibration element comprising:

a tubular elastic base body with a first and a second end, said tubular elastic body having an inner wall with an inner diameter;

a dumbbell-shaped bolt comprised of a connecting element and a first and a second clamping element connected to opposite ends of said connecting element;

said dumbbell-shaped bolt inserted into said base body such that said first clamping element is substantially axially fixed relative to a longitudinal axis of said base body and said second clamping element is axially displaceable relative to said longitudinal axis of said base body;

said first end of said base body has a circumferential outer groove for receiving therein one of the two parts to be connected and said second end of said base body has a circumferential outer groove for receiving therein the other of the two parts to be connected;

said first and said second clamping elements rest at said inner wall of said base body in an area of said circumferential outer grooves; and each of said clamping elements has a diameter that is greater than said inner diameter of said base body.

2. An anti-vibration element according to claim 1, wherein said connecting element is comprised of a substantially rigid material.

3. An anti-vibration element according to claim 1, wherein said connecting element is comprised of an elastic material.

4. An anti-vibration element according to claim 1, wherein
said inner wall of said base body has a bearing for receiving said first clamping element, said bearing being shaped to complement a shape of said first clamping element.

5. An anti-vibration element according to claim 1, wherein said first clamping element has a shape selected from the group consisting of a sphere, a barrel, and a cylinder.

6. An anti-vibration element according to claim 1, wherein said first and said second clamping elements have the same shape.

7. An anti-vibration element according to claim 1, wherein at least one of said first and second clamping elements has a circumferential groove for engagement by a tool.

* * * * *